United States Patent [19]

Yamamoto

[11] Patent Number: 4,623,898

[45] Date of Patent: Nov. 18, 1986

[54] MANUAL PAPER FEED MECHANISM FOR PRINTER

[75] Inventor: Toshiyuki Yamamoto, Tamayama, Japan

[73] Assignee: Alps Electric Co., Ltd., Japan

[21] Appl. No.: 693,276

[22] Filed: Jan. 22, 1985

[30] Foreign Application Priority Data

Jan. 23, 1984 [JP] Japan .............................. 59-6335[U]

[51] Int. Cl.[4] ............................................ G01D 15/10

[52] U.S. Cl. ............................... 346/76 PH; 346/134; 400/120; 400/187; 400/637.1

[58] Field of Search ..................... 400/636, 637, 637.1, 400/120, 648, 649, 651, 355, 356, 187, 600.1-600.4; 219/216 PH; 250/319; 271/257, 272-273; 226/127, 128, 181, 130; 346/76 PH, 76 R, 134, 136

[56] References Cited

U.S. PATENT DOCUMENTS 4,076,112 2/1978 Effinger .......................... 400/639.2
4,350,987 9/1982 Hanagata et al. .............. 346/76 PH

*Primary Examiner*—A. Evans
*Attorney, Agent, or Firm*—Guy W. Shoup

[57] ABSTRACT

A manual paper feed mechanism for a printer has a release lever adapted to permit mounting and demounting of a print paper to and from a platen, a paper feed gear for rotating the paper feed roller, a manual knob having a peripheral gear section engageable with the paper feed gear, and a manual lever supporting the manual knob rotatably and swingably towards and away from the paper feed gear. In addition, the mechanism has a first cam portion formed on the manual lever, and a second cam portion engageable with the first cam portion and formed on the release lever, such that the release lever is rotated in response to the operation of the manual knob and the paper feed gear in engagement with each other. This arrangement selectively permits the manual feed of the print paper by the manuel knob.

3 Claims, 3 Drawing Figures

MANUAL PAPER FEED MECHANISM FOR PRINTER

BACKGROUND OF THE INVENTION 1. (Field of the Invention)

The present invention relates to a manual paper feed mechanism for a printer, particularly a mechanism having a simplified construction.

2. (Description of the Prior Art)

A longitudinal manual paper feed mechanism of the kind described has been known as having a manual paper feed mechanism having a release lever adapted to permit mounting and demounting of a print paper to and from a platen, a paper feed gear for rotating the paper feed roller, a manual knob having a peripheral gear section engageable with the paper feed gear, and a manual lever supporting the manual knob rotatably and swingably towards and away from the paper feed gear.

In this conventional mechanism, the manual knob is made to engage with a paper feed gear and, after releasing the pressure of the head by an operation of a switch, the manual knob is rotated to drive the paper feed gear and the paper feed roller, thereby manually feeding the paper.

This known paper feeding mechanism, however, suffers from problems such as a complication of the construction and a rise in the production cost, due to the necessity for the electric circuit including the switch. Another problem is that the manual paper feed by the manual knob cannot be conducted unless the electric power is supplied to the printer because, without the power, the switch does not operate.

SUMMARY OF THE INVENTION 1. (Object of the Invention)

In view of the above status of the prior art, an object of the invention is to provide a manual paper feed mechanism which is improved to permit a manual feeding of paper without employing any electric circuit including a switch.

2. (Brief Summary of the Invention)

To this end, the invention provides a manual paper feed mechanism having a release lever adapted to permit mounting and demounting of a print paper to and from a platen, a paper feed gear for rotating the paper feed roller, a manual knob having a peripheral gear section engageable with the paper feed gear, and a manual lever supporting the manual knob rotatably and swingably towards and away from the paper feed gear, wherein the improvement comprises a first cam portion formed on the manual lever, and a second cam portion engageable with the first cam portion and formed on the release lever, such that the release lever is rotated in response to the operation of the manual knob and the paper feed gear in engagement with each other, thereby to permit the manual feed of the print paper by the manual knob.

The above and other objects, features and advantages of the invention will become clear from the following description of the preferred embodiment when the same is read in conjunction with the accompanying drawings.

BRIEF DESCRIPTION OF THE DRAWINGS

FIGS. 1 to 3 are illustrations of a manual paper feed mechanism for a printer in accordance with the invention in which:

FIG. 1 is a side elevational view of an essential part in the state of a printing operation;

FIG. 2 is a side elevational view of an essential part for manual paper feed operation; and FIG. 3 is a side elevational view of an essential part in the state in which the release lever has been operated.

DESCRIPTION OF THE PREFERRED EMBODIMENT

An embodiment of the manual paper feed mechanism for a printer in accordance with the invention will be described hereinunder with reference to the accompanying drawings.

Figure 1:
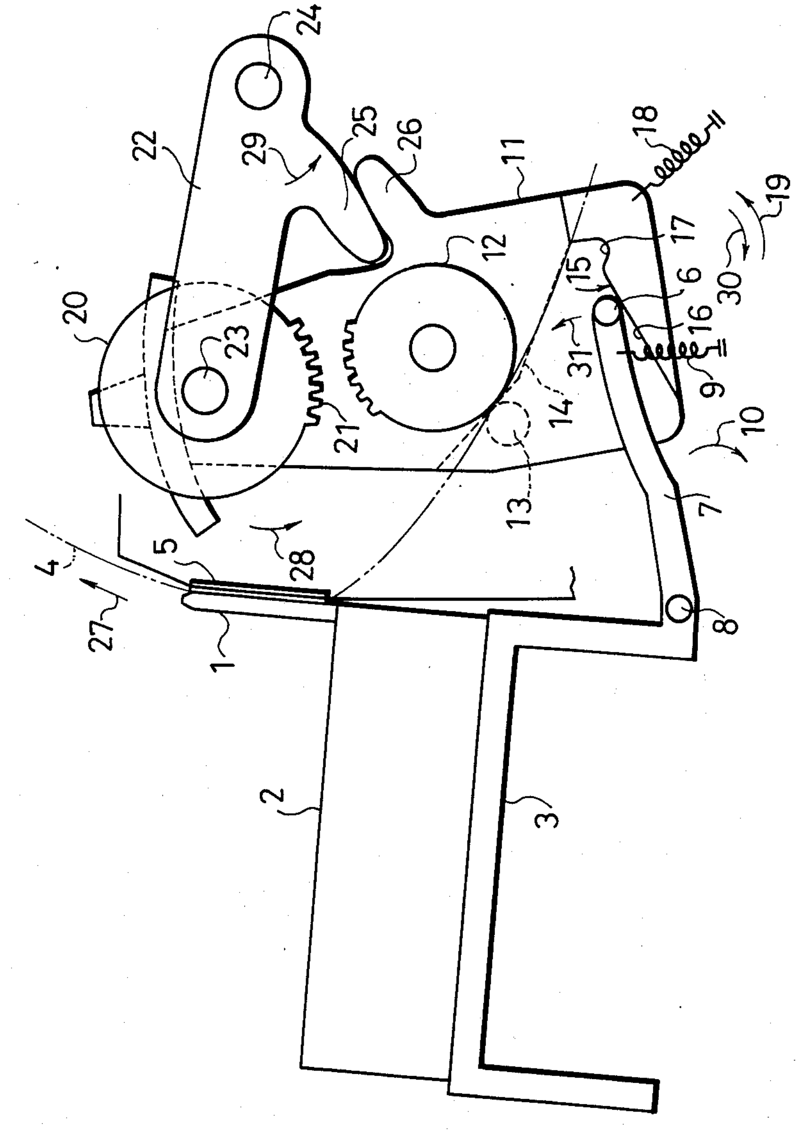
Figure 2:
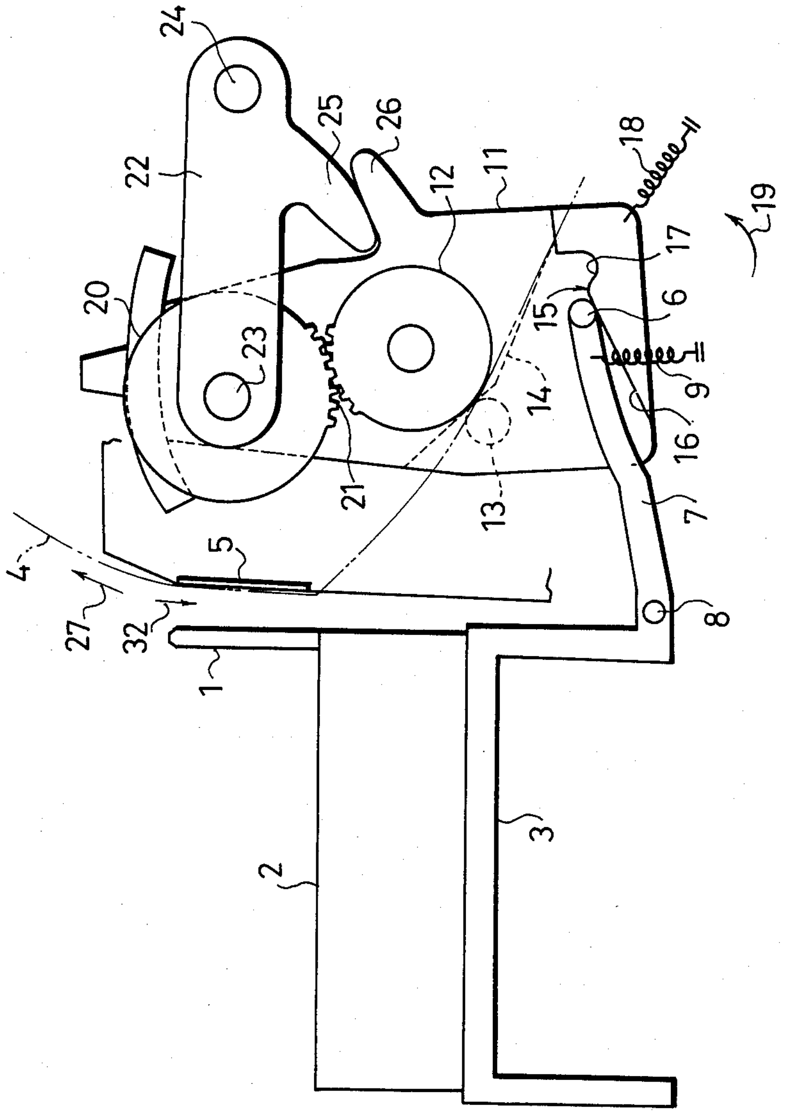
Figure 3:
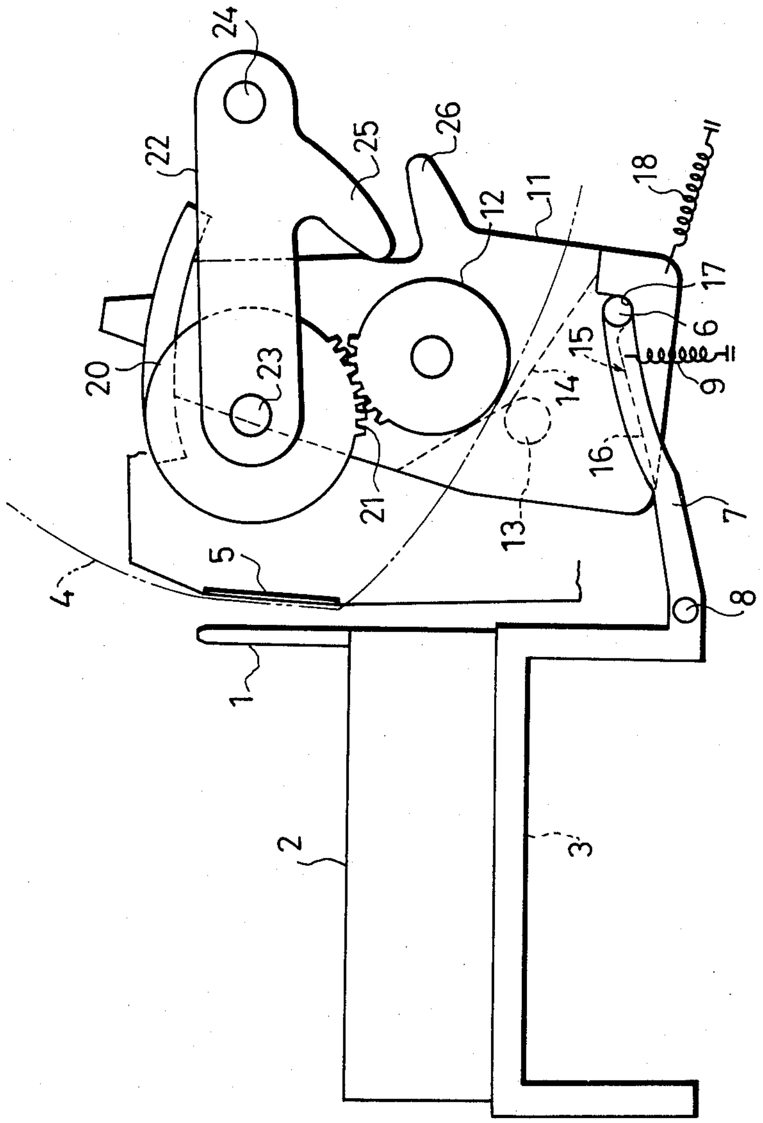

FIGS. 1 to 3 in combination show an embodiment of the invention. More specifically, FIG. 1 is a side elevational view of an essential part of the embodiment during printing, FIG. 2 is a side elevational view of an essential part in the state for manual paper feed, and FIG. 3 is a side elevational view of an essential part in the state where a release lever has been operated.

Referring to these Figures, reference numeral 1 denotes a head such as a thermal head, 2 denotes a carriage mounting the thermal head, 3 denotes a carriage guide plate movably mounting the carriage 2, 4 denotes a print paper, and 5 denotes a platen on which the print paper 4 is wound. The carriage plate 3 has a lever 7 which is provided at its end with a cylindrical projection 6, and is rotatable about an axis 8. Reference, numeral 9 designates a spring which is retained at one end by the lever 7 and at its other end by a printer frame which is not shown. The spring 9 serves to bias the carriage guide plate 3 clockwise as viewed in the Figure, i.e., in the directicn of the arrow 10.

Reference numeral 11 denotes a release lever which permits mounting and demounting of the print paper 4 to and from platen 5, 12 denotes a paper feed gear adapted to rotate a paper feed roller and 13 denotes a small roller which is movable into and out of pressure contact with the paper feed roller.

A reference numeral 14 designates a cam portion which is formed on one side of the release lever 11 and engaged by a shaft which carries the above-mentioned small roller 13. Another cam portion 15 formed on the other surface of the release lever 11 has a straight portion 16 and a recess 17. The projection 6 on the lever 7 is held in engagement with this cam portion 15. Reference numeral 18 denotes a spring which is retained at its one end by the release lever 11 and at its other end by the printer frame which is not shown. The spring 18 acts to bias the release lever 11 counter-clockwise as viewed in the Figure, i.e., in the direction of the arrow 19 in FIG. 1.

A reference numeral 20 denotes a manual knob which has a peripheral gear portion 21 engageable with the paper feed gear 12. A reference numeral 22 denotes a manual lever which rotatably supports the manual knob 20 and supports also the manual knob 20 for rotation towards and away from the paper feed gear 12. The manual knob 20 and the manual lever 22 are connected to each other through a shaft 23. The manual lever 22 is rotatably mounted on the printer frame which is not shown, through a shaft 24. The manual lever 22 is provided with a first cam portion 25, while the release lever is provided with a second cam portion 26 adapted to engage the first cam portion 25. As stated before, the paper feed gear 12 is selectively engageable with a driving gear which is driven by a paper feed motor which is not shown. Namely, the paper feed gear 12 is normally held in engagement with the driving gear but, when it is to be engaged with the manual knob 20, it is slided in the direction perpendicular to the plane of FIG. 1 so as to be disengaged from the driving gear.

The operation of the manual paper feed mechanism having the described construction is as follows.

During printing, as shown in FIG. 1, the manual knob 20 is spaced apart upwardly from the paper feed gear 12, and the release lever 11 has a clockwise rotation tendency due to the biasing force exerted by the spring 18. The small roller 13 and the paper feed roller clamp therebetween the print paper 4. The projection 6 on the lever 7 of the carriage guide plate 3 is kept in engagement with the straight section 16 of the cam section 15 by the force of the spring 9, and the carriage guid plate 3 tends to rotate about the axis 8 in the direction of the arrow 10. Consequently, the thermal head 1 is urged towards the platen 5 so as to press the print paper 4 onto the platen 5.

As the thermal head 1 is energized, the carriage driving means (not shown) is activated so that the carriage 2 is moved in the direction perpendicular to the plane of FIG. 1, thereby effecting the desired printing on the print paper 4.

At the same time, the carriage guide plate rotating means (not shown) is activated to rotate the carriage guide plate 3 in the direction opposite to the direction of the arrow 10 so as to release the pressure of the thermal head on the platen 5, and the paper feed motor (not shown) is started to rotate the paper feed gear 12. In consequence, the paper feed roller (not shown) and the small roller 13 are rotated to automatically feed the print paper 4 in the direction of the arrow 27 for example.

For the manual feed of the print paper, the manual knob 20 is depressed in the direction of the arrow 28 from the state shown in FIG. 1, so that the paper feed gear 12 is disengaged from the driving gear which is driven by the paper feed motor (not shown). At the same time, the gear portion 21 of the manual knob 20 is brought into engagement with the paper feed gear 12. A depression of the manual knob 20 in the direction of the arrow 28 in FIG. 1 causes a rotation of the first cam section 25 of the manual lever 22 about the axis 24 in the direction of the arrow 29, which in turn causes, through the second cam portion 26 engaging the first cam portion 25, the release lever 11 to be rotated in the direction of the arrow 30 in FIG. 1 against the force of the spring 18. Consequently, the projection 6 engaging the cam portion 15 is rotated in the direction of the arrow 31 overcoming the force of the spring 9, and the parts united with the projection 6 such as the lever 7, carriage guide plate 3, carriage 2 and the thermal head 1 are rotated counter-clockwise as viewed in FIG. 1, thereby the pressure exerted by the thermal head 1 on the platen 5 is released. In this state, the small roller 13 is kept in engagement with the upper portion of the cam section 14 of the release lever 11. As the operator manually rotates the manual knob in this state, the paper feed gear 12 is rotated through the gear portion 21 followed by the rotation of the paper feed roller (not shown), so that the print paper 4 clamped between the small roller 13 and the paper feed roller is fed in the direction of the arrow 27 or the arrow 32. As the depressing force which has been exerted through the manual knob 20 is released, the release lever 11 springs back by the force of the spring 18 in the direction of an arrow 19, so that the manual knob 20 is moved upwardly through the action of the second cam portion 26, first cam portion 25 and the manual lever 22, to take the state as shown in FIG. 1.

In operating the release lever, the release lever 11 is rotated clockwise overcoming the force of the spring 18 from the state shown in FIGS. 1 and 2, so that the small roller 13 is moved to a position where it can engage the lower portion of the cam section 14 of the release lever 13 as shown in FIG. 3. Consequently, the pressure contact of the small roller 13, i.e., the clamping of the print paper 4, is released. At the same time, the projection 6 on the end of the level 7 fits in the recess 17 in the cam section 15 of the release lever 11 so that the thermal head 1 is locked at a position where it does not make pressure contact with the platen 5, thus allowing the operator to freely remove the taking up of the print paper 4 or to place a new print paper 4 on the platen 5.

As has been described, according to the invention, a first cam portion 25 is formed on the manual lever 22 which supports the manual knob 20 while a second cam portion 26 engageable with the first cam portion 25 is formed on the release lever 11. The release lever 11 is rotated following the operation of the manual knob 20 and the paper feed gear 12 which are in engagement with each other so as to release the pressure of the thermal head 1 on the platen 5, thereby allowing the small roller 13 to unclamp the print paper 4. It is, therefore, possible to effect a manual paper feed solely by mechanical means.

(Effect of the Invention)

As will be fully understood from the foregoing description, the manual paper feed mechanism for a printer in accordance with the invention has a first cam portion formed on the manual lever and a second cam portion engageable with the first cam portion and formed on the release lever. It is, therefore, possible to perform the manual paper feed without necessitating an electric circuit which is indispensable in the conventional mechanism. Consequently, the construction is simplified and the production cost is lowered advantageously.

The elimination of the necessity for the electric circuit including a switch is advantageous also in that the operator can conduct the manual paper feed even when electic power is not supplied to the printer, so that the invention affords an advantage also from the view point of handling.

Although the invention has been descrbed through specific terms, it is to be noted that the described embodiment is only illustrative and various changes and modifications may be imparted thereto without departing from the scope of the invention which is limited solely by the appended claim.

What is claimed is:

1. A manual paper feed mechanism for a printer of the type having a platen, a print head for printing on a paper supported by the platen, the print head being mounted on a carriage movable toward or away from the platen, a rotatable paper feed roller for feeding paper with respect to the platen, and a paper feed gear for rotating the paper feed roller, said mechanism comprising:

a movable manual lever supporting a rotatable manual knob having a peripheral gear section engageable with the paper feed gear, said manual lever being operable to move said manual knob and peripheral gear section toward and away from the paper feed gear and having a first cam portion thereon;

a pivotable release lever mounting the paper feed gear and having a second cam portion and a linkage for moving the carriage away from the platen when said release lever is moved to a first position;

said first cam portion of said manual lever being engageable with said second cam portion on said release lever when said manual lever is operated so as to pivot said relase lever to said first position moving the carriage away from the platen, whereby manual feeding of the paper can be effected without interference of the print head with the paper.

2. A manual paper feed mechanism as described in claim 1 further comprising a displaceable pressure roller for holding the paper against the paper feed roller, wherein said release lever has a third cam portion engaged with a portion of said pressure roller and is pivotable to a second position wherein said pressure roller is displaced away from the paper feed roller by said third cam portion.

3. A manual paper feed mechanism as described in claim 2, wherein said release lever has a detent for holding the linkage locked when said release lever is in said second position to lock said carriage away from the platen, wherein the paper can be freely moved or loaded with respect to the platen.

* * * * *